May 27, 1958 J. D. HATHAWAY 2,836,455
CONVERTIBLE CARRYING BOX FOR VEHICLE BEDS
Filed July 11, 1955 2 Sheets-Sheet 1
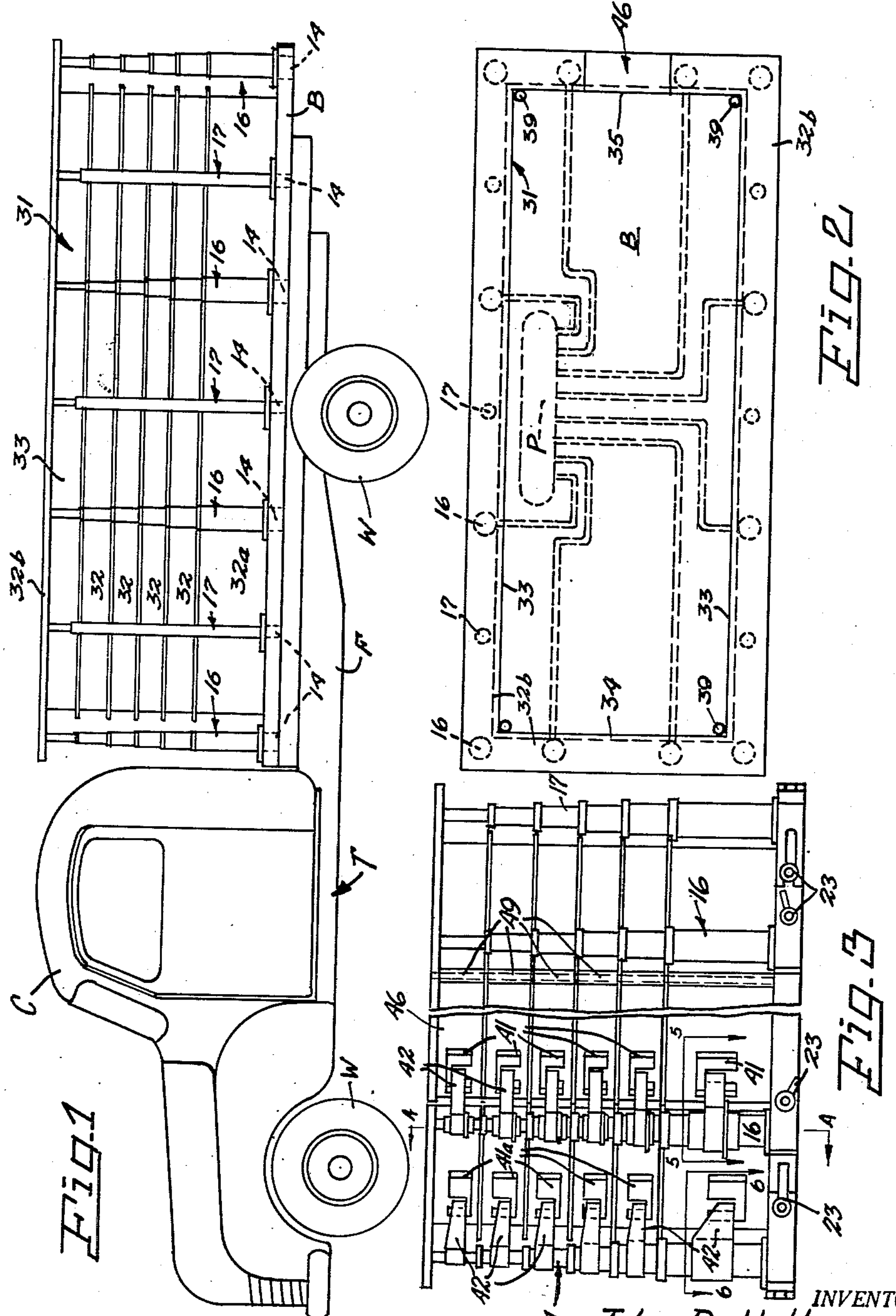
INVENTOR.
John D. Hathaway
BY
Norman H. Huff CONVERTIBLE CARRYING BOX FOR VEHICLE BEDS
Filed July 11, 1955 2 Sheets-Sheet 2
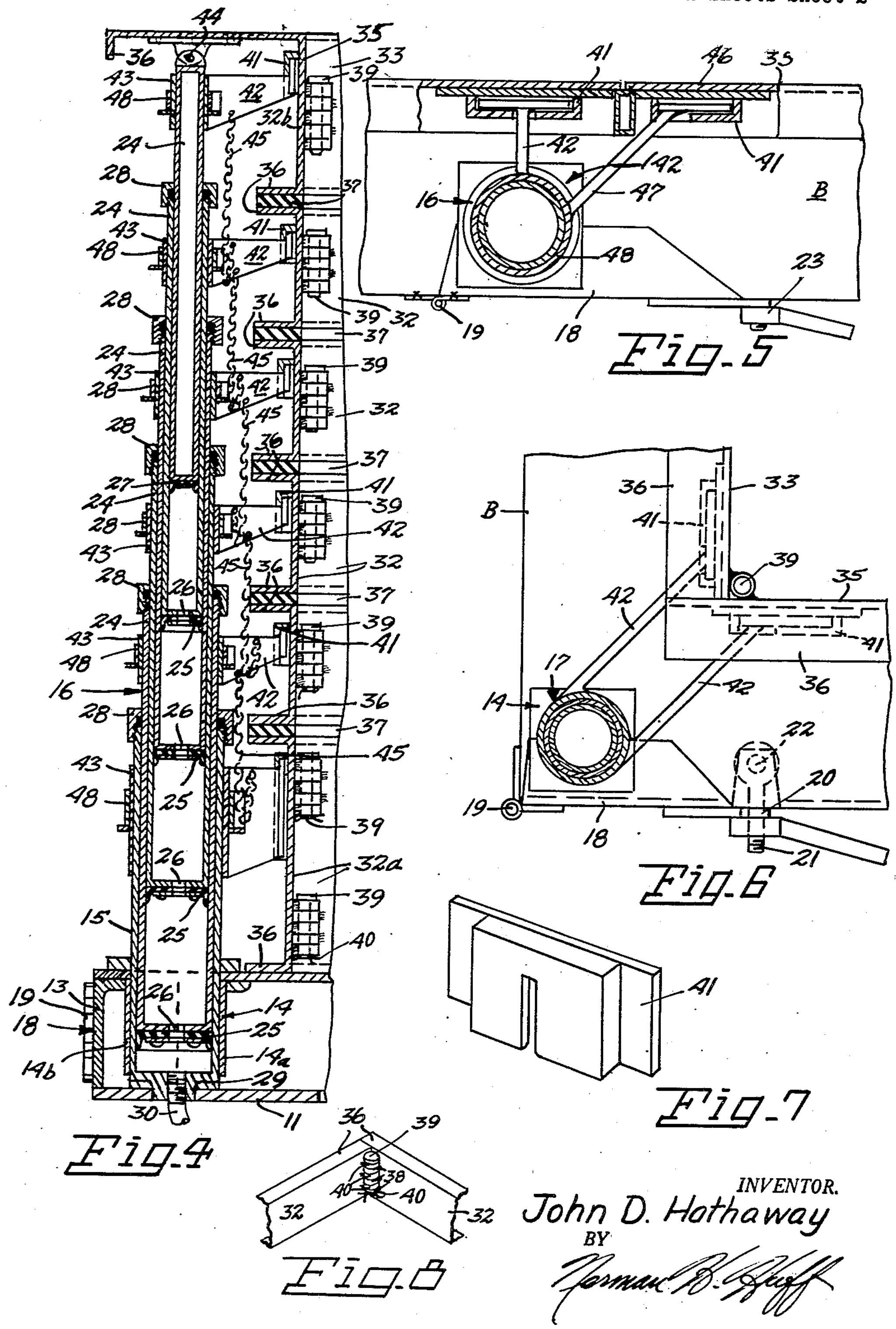
INVENTOR.
John D. Hathaway
BY
Norman B. Hoff United States Patent Office 2,836,455

Patented May 27, 1958

2,836,455

CONVERTIBLE CARRYING BOX FOR VEHICLE BEDS

John D. Hathaway, Spokane, Wash.

Application July 11, 1955, Serial No. 521,193

2 Claims. (Cl. 296—10)

My present invention is a convertible carrying box for vehicles.

The primary object of this invention is to provide a carrying box or rack for vehicles that may be easily and quickly converted from a rack box construction to a tight box for hauling grain or the like, and as quickly and easily returned to a rack box for hauling animals and the like.

Another object of the invention lies in the provision of a convertible carrying box including a plurality of circumferentially continuous bands disposed in vertical succession and movable from a position in contiguity to spaced relationship according to manual selection.

Yet another object of the invention lies in the provision of a carrying box for vehicles having said plural bands which are operated by means of fluid pressure expansion motors releasably carried by the bed of said vehicle.

A further object of the invention lies in the provision of a convertible carrying box for vehicles which not only is selectively changeable from a grain carrying box to a cattle rack, but also is provided with a gate, segments of which form a portion of said bands and which may be selectively opened and closed.

A still further object of the invention lies in the provision of a carrying box for vehicles that is inexpensive to manufacture, light weight, and very durable in use.

These and other objects of the invention will become apparent during the course of the following description which is to be considered in association with the accompanying drawings, in which like numerals are employed to designate like parts.

In the drawings forming a part of this application:

Figure 1 is a line drawing of a truck in side elevation including the convertible carrying box constituting the subject matter of the present invention;

Figure 2 is a plan view of the carrying box associated with a truck bed;

Figure 3 is an enlarged rear end elevation of the carrying box and truck bed;

Figure 4 is a fragmentary vertical cross section taken substantially on the plane indicated at line 4—4 of Figure 3 and shown at a further enlarged scale;

Figure 5 is a fragmentary horizontal cross section as at line 5—5 of Figure 3;

Figure 6 is a fragmentary horizontal cross section taken on the plane indicated at line 6—6 of Figure 3;

Figure 7 is a perspective view of one socket for uniting the expansion motor and a slat; and Figure 8 is a perspective view of two slats releasably interconnected at a corner.

Referring now more particularly to the drawing, in Figure 1, I have shown a truck T having the conventional frame F supported on wheels W and including the cab C and a flat bed B.

As seen in Figure 4, the bed B is provided with an upper supporting face 10 which is preferably sheet metal of sufficient gauge to support the weight of grain or other commodity or load carried thereon, and spaced therebelow the bed is provided with a second plate 11 secured to the bed framework 12 and covering its lower face marginal edge portion. The edge faces of the bed B are closed by means of an angle or channel member 13.

Spaced about the marginal edge portions of bed B are a plurality of sockets 14 which are disclosed more particularly in Figures 4, 5, and 6 of the drawing. It will be seen that the sockets 14 are provided with cooperating semicylindrical portions 14$a$ and 14$b$ which together form a cylinder adapted to receive the base or butt end 15 of the fluid pressure expansion motors 16 or the lower ends of the telescopic guide members 17. The portion 14$b$ is carried in a block 18 which is hinged at 19 to the bed B. The block is provided with a bifurcated lip 20 which is adapted to receive the anchor bolt 21 pivotally connected at 22 to the bed B and provided with a hand operated clamping nut 23. It will thus be seen that the nut 23 may be loosened and the bolt pivoted about its pivotal mounting at 22 until the nut 23 will clear the lip 20, and then the block 18 may be swung outwardly on its hinge 19, thus releasing the base 15 of the motors 16 and guides 17.

As seen in Figure 4, the expansion motors 16 each comprise a plurality of telescopically united piston members 24. The piston heads 25 of certain ones of the members 24 are provided with ports 26 through which the fluid under pressure may flow through one piston head to the others, except that it will be seen that the piston head 27 of the uppermost piston member 24 is closed. Conventional packing glands and rings 28 are provided at the joints between said several piston members 24 and at its lower end the expansion motor 16 is provided with a cylinder head 29 to which is secured a fluid conduit 30 in communication therewith.

Obviously, therefore, as fluid under pressure is admitted into the expansion motors 16 from the fluid power source P, the several telescopic members will extend, and as the fluid is released therefrom, the members will telescope inwardly by weight, forcing the fluid therefrom.

A rack, indicated in general by the numeral 31, is constructed of a plurality of slats 32, the lower one of which, 32$a$, is secured as by welding or riveting to the bed B. The upper one, 32$b$, is substantially angular in cross section. The slats are disposed one upon another to form side walls 33—33, front wall 34, and rear wall 35. Each of the slats 32 is provided with upper and lower parallel flanges 36, and cushioning material 37 such as rubber strips is disposed intermediate the flanges 36 of successive slats 32 and preferably is bonded or otherwise secured to one of the pair of flanges. The flanges 36 are primarily supplied for the purpose of strengthening the slats.

The slats 32, 32$a$, and 32$b$, in common courses are releasably secured together at their meeting ends, as seen in Figure 8, by means of hinge type mechanism 38 wherein two of the sleeves are secured as by welding to one slat and a single sleeve adapted to be disposed intermediate said two sleeves is secured to the other slat. A securing pin 39 is then dropped through the aligned sleeves and secured by means of a cotter key 40.

All of the slats on a single course being secured together form a circumferentially continuous band which is disposed in a plane parallel to the plane of the bed B, and with the slats in vertical succession as seen in Figure 4, they constitute the walls of the box.

Spaced along the length of each slat, I provide anchor sockets 41 which are particularly shown in Figure 7, and these are adapted to receive cooperating anchor plates 42 which are carried by sleeves 43, one encircling each piston member 24 of the expansion motor 16 and confined against relative longitudinal movement thereon, as by welding or otherwise. At its upper end, the expansion motor 16 is secured at 44 to the slat **32*b*** and supports the horizontal flange member of said slat.

To limit the spreading movement of the several bands or slats, I provide lost motion links or chains 45, which are here shown to be secured one intermediate each pair of successive anchor plates 42. As the slats 32 are suitably spaced, say, three inches, the chains 45 reach their limit of movement and preclude further separating movement of the expansion motor 16 and thereby accurately position the several slats.

In the rear wall 35, the box 31 is provided with a gate at 46. This gate is a continuation of the slats 32, **32*a*, and 32*b*, but the segments forming the gate are separable therefrom. The segments are held in relation thereto by means of hinged plates 47 which are carried by rings 48 loosely encircling the sleeves 43, as seen particularly in Figure 5, so that the several segments forming the gate 46** may be swung or hinged outwardly to open the rear wall.

At the side opposed to the hinged side, the gate 46 is provided with aligned sleeves 49. A rod may be disposed through the flanges 36 and the sleeves 49 to secure the gate in the closed position. It will be noted in Figure 3 of the drawing that the sockets **41*a* are inverted with respect to the sockets 41 associated with the expansion motor 16, since the guide members 17 are employed strictly to maintain the bands in proper alignment. With sufficient body strength inherent in the slats 32, the guide members 17** may be omitted from the structure.

Having thus described my invention, I claim:

1. In a device of the class described, a convertible body comprising a bed; a plurality of slats, groups of which are interconnected at their ends to form circumferentially continuous bands disposed in vertical succession and constituting side walls supported upon said bed; said bands being interconnected by lost motion linkage, fluid pressure expansion motors carried by said bed outside of said walls and spaced circumferentially thereabout and operably connected to alternately raise and lower the upper one of said bands, whereby the bands may be alternately raised to a position wherein they are spaced apart and lowered to a position wherein they are disposed in contiguity; and a manually operable gate in one said wall having segments releasably interconnected as portions of said bands and mounted for movements therewith.

2. In a device of the class described, a convertible body comprising a bed; a plurality of slats, groups of which are interconnected at their ends to form circumferentially continuous bands disposed in vertical succession and constituting side walls supported upon said bed; said bands being interconnected by lost motion linkage, fluid pressure expansion motors carried by said bed outside of said walls and spaced circumferentially thereabout and operably connected to alternately raise and lower the upper one of said bands, whereby the bands may be alternately raised to a position wherein they are spaced apart and lowered to a position wherein they are disposed in contiguity; sockets in said bed releasably securing said expansion motors therein; each said socket having companion semicylindrical portions cooperable to encircle the lower end of said expansion motor, one portion of which is hinged on an axis parallel to the axis of said socket to mount one semicylindrical portion for movement away from its companion portion; and manually releasable means for anchoring said portions in cooperating relationship surrounding the lower end of said expansion motor.

References Cited in the file of this patent

UNITED STATES PATENTS

| | | |
|---|---|---|
| 1,311,429 | Weir | July 29, 1919 |
| 1,392,011 | Hedberg | Sept. 27, 1921 |
| 1,893,532 | Ball | Jan. 10, 1933 |
| 2,561,921 | Guillot | July 24, 1951 |
| 2,597,086 | Morrow | May 20, 1952 |

FOREIGN PATENTS

| | | |
|---|---|---|
| 258,758 | Great Britain | Sept. 30, 1926 |